(12) United States Patent
Li et al.

(10) Patent No.: US 11,431,419 B2
(45) Date of Patent: *Aug. 30, 2022

(54) QUANTUM KEY DISTRIBUTION SYSTEMS HAVING LOW LOSS DISPERSION LIMITING FIBERS

(71) Applicant: CORNING INCORPORATED, Corning, NY (US)

(72) Inventors: Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/297,029

(22) PCT Filed: Nov. 12, 2019

(86) PCT No.: PCT/US2019/060989
§ 371 (c)(1),
(2) Date: May 26, 2021

(87) PCT Pub. No.: WO2020/112347
PCT Pub. Date: Jun. 4, 2020

(65) Prior Publication Data
US 2021/0399810 A1 Dec. 23, 2021

Related U.S. Application Data

(60) Provisional application No. 62/771,711, filed on Nov. 27, 2018.

(51) Int. Cl.
*H04B 10/70* (2013.01)
*G02B 6/02* (2006.01)
(Continued)

(52) U.S. Cl.
CPC ......... *H04B 10/70* (2013.01); *G02B 6/02214* (2013.01); *H04B 10/2513* (2013.01); *H04L 9/08* (2013.01)

(58) Field of Classification Search
None
See application file for complete search history.

(56) References Cited

U.S. PATENT DOCUMENTS 6,445,864 B2   9/2002  Jiang et al.
6,466,721 B1 * 10/2002  Tsukitani ........... G02B 6/03644
                                                             385/127
(Continued)

FOREIGN PATENT DOCUMENTS

CN   101111977 A   1/2008
CN   101118301 A   2/2008
(Continued)

OTHER PUBLICATIONS

Alberto Boaron et al: Secure quantum key distribution over 421 km of optical fiber, arxiv.org, Cornell University Library, 201 Olin Library Cornell University Ithaca, NY 14853 Jul. 9, 2018 (Jul. 9, 2018).

(Continued)

*Primary Examiner* — Jai M Lee
(74) *Attorney, Agent, or Firm* — Svetlana Short (57) ABSTRACT

A quantum communications system includes a quantum key generation system having a photonic quantum bit generator, a low loss dispersion limiting fiber having a length L, for example greater than 200 km, and a photon detector unit and a communications network having a signal generator, a signal channel, and a signal receiver. The low loss dispersion limiting fiber extends between and optically couples the photonic quantum bit generator and the photon detector unit. Further, the low loss dispersion limiting fiber is structurally configured to limit dispersion at an absolute dispersion rate (Continued)

of about 9 ps/(nm)km or less, and preferably 0.5 ps/(nm)km or less, and induce attenuation at an attenuation rate of about 0.175 dB/km or less such that the quantum key bit information of a plurality of photons output by the one or more photonic quantum bit generators is receivable at the photon detector unit at a bit rate of at least 10 Gbit/sec.

27 Claims, 4 Drawing Sheets (51) Int. Cl.
*H04B 10/2513* (2013.01)
*H04L 9/08* (2006.01)

(56) References Cited

U.S. PATENT DOCUMENTS

| | | | |
|---|---|---|---|
| 8,855,316 B2 * | 10/2014 | Wiseman | H04L 9/0855 380/278 |
| 9,313,180 B1 * | 4/2016 | Gray | H04L 9/0855 |
| 11,218,226 B2 * | 1/2022 | Li | H04B 10/25133 |
| 2005/0008797 A1 | 1/2005 | Bayha et al. | |
| 2005/0111803 A1 | 5/2005 | Bickham | |
| 2005/0185906 A1 * | 8/2005 | Bickham | G02B 6/03611 385/127 |
| 2006/0257071 A1 | 11/2006 | Bise et al. | |
| 2007/0116418 A1 | 5/2007 | Mishra | |
| 2010/0226659 A1 | 9/2010 | Nishioka et al. | |
| 2011/0268401 A1 | 11/2011 | Wei | |
| 2013/0163759 A1 | 6/2013 | Harrison et al. | |
| 2014/0355998 A1 | 12/2014 | Tanzilli et al. | |
| 2015/0316713 A1 * | 11/2015 | Yamamoto | G02B 6/02276 385/127 |
| 2015/0372768 A1 | 12/2015 | Dynes et al. | |
| 2017/0119176 A1 | 5/2017 | Christiansen et al. | |
| 2018/0198608 A1 | 7/2018 | Nordholt et al. | |
| 2021/0399810 A1 * | 12/2021 | Li | H04B 10/2507 |

FOREIGN PATENT DOCUMENTS

| | | |
|---|---|---|
| EP | 0418123 A1 | 3/1991 |
| EP | 1257076 A1 | 11/2002 |
| FR | 2632950 A1 | 12/1989 |
| WO | 2015/050623 A2 | 4/2015 |
| WO | 2016/204847 A2 | 12/2016 |
| WO | 2018/160781 A1 | 9/2018 |
| WO | 2018/213213 A1 | 11/2018 |

OTHER PUBLICATIONS

Hasegawa et al., "Experimental realization of quantum cryptosystem over 87 km", Quantum Electronics and Laser Science, Jun. 1-6, 2003, pp. 1-2.

Hua-Lei Yin et al: "Measurement device independent quantum key distribution over 404 km optical fibre", arxiv.org, Cornell University Library, 201 Olin Library Cornell University Ithaca, NY 14853 Jun. 22, 2016 (Jun. 22, 2016).

International Search Report and Written Opinion of the International Searching Authority; PCT/US2019/060989; dated Apr. 17, 2020, 11 pages; European Patent Office.

Mora et al; "Dispersion Supported BB84 Quantum Key Distribution Using Phase Modulated Light"; IEEE Photonics Journal, vol. 3, No. 3, Jun. 2011; pp. 433-440.

Nishioka et al., "Single-Photon Interference Experiment Over 80 km With a Pulse-Driven Heralded Single-Photon Source", IEEE Photonics Technology Letters, vol. 20, No. 5, Mar. 1, 2008, pp. 354-356.

Ozhegov R et al: "Quantum key distribution over 300", Proceedings of SPIE/ IS & T vol. 9440, Dec. 18, 2014 (Dec. 18, 2014), pp. 94401F-94401F.

Sangouard et al; "Quantum Repeaters Based on Atomic Ensembles and Linear Optics," Group of Applied Physics, vol. 83, 2009, pp. 1-52.

Shu et al., "Effects of loss and dispersion on fiber-based quantum key distribution", Proc. of Spie., vol. 7136, Nov. 11, 2008, pp. 71360B-1-71360B-8.

Stucki D et al., "High rate, long-distance quantum key dirstibution over 250 km of ultra low loss fibres", New Journal of Physics, Institute of Physics Publishing, Bristol, GB, vol. 11, No. 7, Jul. 1, 2009 (Jul. 1, 2009), p. 75003.

Takesue et al., "Quantum key distribution over a 40-dB channel loss using superconducting single-photon detectors", Jun. 1, 2007, pp. 343-348.

Mora et al., "Dispersion Supported BB84 Quantum Key Distribution Using Phase Modulated Light" In IEEE Photonics Journal, vol. 3, No. 3, Jun. 2011, 9 Pages.

Takesue et al., "Quantum key distribution over a 40-dB channel loss using superconducting single-photon detectors", Jun. 1, 2007, 15 pages.

Chinese Patent Application No. 201880028684.2, Office Action dated Feb. 25, 2022, 06 pages of English Translation, Chinese Patent Office.

Guang Wu, et al., "Single-photon interference and router-control in an optic fiber Sagnac interferometer", Acta Physica Sinica, vol. 53(3), 2004, pp. 698-702.

* cited by examiner

QUANTUM KEY DISTRIBUTION SYSTEMS HAVING LOW LOSS DISPERSION LIMITING FIBERS

CROSS-REFERENCE TO RELATED APPLICATION

This application claims the benefit of priority under 35 U.S.C. § 371 of International Application No. PCT/US2019/060989, filed on Nov. 12, 2019, which claims the benefit of priority under 35 U.S.C. § 119 of U.S. Provisional Application Ser. No. 62/771,711 filed on Nov. 27, 2018, the content of which is relied upon and incorporated herein by reference in its entirety.

BACKGROUND

The present disclosure relates to quantum communication systems having low loss dispersion limiting fibers. More specifically, the present disclosure relates to quantum communication systems that include a quantum key generation system with components optically coupled using low loss dispersion limiting fibers for providing increased quantum key bit rates.

BRIEF SUMMARY

According to some embodiments of the present disclosure a quantum system comprises:
a quantum key system comprising a photonic quantum bit generator, a low loss dispersion limiting fiber, and a photon detector unit; and
a signal receiver; wherein:
the low loss dispersion limiting fiber extends between and optically couples the photonic quantum bit generator and the photon detector unit having a length L (for example, L is between 100 km and 2000 km, or between 200 and 1000 km);
the photonic quantum bit generator is structurally configured to output a plurality of photons each comprising quantum key bit information;
the photon detector unit is structurally configured to receive the quantum key bit information of the plurality of photons;
the signal receiver is communicatively coupled to the photon detector unit and is structurally configured to compare the one or more signal bits with the quantum key bit information upon receipt of the signal; and
the low loss dispersion limiting fiber comprises a core and a cladding surrounding the core and is structurally configured to limit dispersion of a photon pulse having a wavelength of about 1550 nm at an absolute dispersion rate of about 9 ps/(nm)km or less and induce attenuation of the photon comprising the wavelength of about 1550 nm at an attenuation rate of about 0.175 dB/km or less such that the quantum key bit information of the plurality of photons output by the photonic quantum bit generator is receivable at the photon detector unit at a bit rate of at least 10 Gbit/sec.

According to the some embodiments of the present disclosure a quantum communications system includes a quantum key generation system having a photonic quantum bit generator, a low loss dispersion limiting optical fiber, and a photon detector unit and a communications network having a signal generator, a signal channel, and a signal receiver. The low loss dispersion limiting fiber extends between and optically couples the photonic quantum bit generator and the photon detector unit. The photonic quantum bit generator is structurally configured to output a plurality of photons each including quantum key bit information. The photon detector unit is structurally configured to receive the quantum key bit information of the plurality of photons. The signal channel extends between and communicatively couples the signal generator and the signal receiver. The signal generator is structurally configured to output a signal comprising one or more signal bits. The signal receiver is communicatively coupled to the photon detector unit and is structurally configured to compare the one or more signal bits with the quantum key bit information upon receipt of the signal. Further, the low loss dispersion limiting optical fiber has a length L>200 km and includes a core and a cladding surrounding the core. The low loss dispersion limiting optical fiber is structurally configured to limit dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.175 dB/km or less such that the quantum key bit information of the plurality of photons output by the photonic quantum bit generator are receivable at the photon detector unit at a raw bit rate of at least 10 Gbit/sec. According to some embodiments, the key rate of the rate of the quantum key generation system is at least 10 Kbits/sec/

According to some embodiments the low loss dispersion limiting optical fiber is structurally configured to limit dispersion of a photon comprising a wavelength of about 1550 nm at an absolute dispersion rate of about 9 ps/(nm)km (i.e., 9 ps/nm·km, or 9 picoseconds per nm per km) or less and induce attenuation of the photon comprising the wavelength of about 1550 nm at an attenuation rate between 0.12 dB/km and 0.175 dB/km.

In accordance with one embodiment of the present disclosure the quantum communications system further comprises a laser and a spectral filter optically coupled to the laser, the spectral filter is a bandpass filter with the bandpass width of 0.2 nm to 0.5 nm.

In accordance with one embodiment, the low loss dispersion limiting fiber has a core and a cladding surrounding the core and is structurally configured to limit dispersion of a photon comprising a wavelength of about 1550 nm at an absolute dispersion rate of about 5 ps/(nm)km (also referred to as 5 ps/nm·km) or less.

In accordance with one embodiment, the low loss dispersion limiting fiber has a core and a cladding surrounding the core and is structurally configured to limit dispersion of a photon comprising a wavelength of about 1550 nm at an absolute dispersion rate of about 5 ps/(nm)km (also referred to as 5 ps/nm·km) or less, and the quantum communications system does not include a spectral filter optically coupled to a laser or to photon generator. According to some embodiments the quantum communications system does not include a spectral filter situated inside the photonic quantum bit generator.

In accordance with one embodiment there is no optical transmission fiber situated between the photonic quantum bit generator and the photon detector unit that is coupled to the low loss optical low dispersion fiber. In accordance with one embodiment, the quantum communications system, further comprises an intensity modulator and a beam splitter, such that there is no optical transmission situated between the intensity modulator and the beam splitter.

In accordance with one embodiment of the present disclosure a quantum key generation system including a low loss dispersion limiting fiber extending between and optically coupling a photonic quantum bit generator and a photon detector unit. The low loss dispersion limiting fiber has a core and a cladding surrounding the core and is structurally configured to limit dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.175 dB/km or less such that quantum key bit information of a plurality of photons output by the photonic quantum bit generator is receivable at the photon detector unit at a bit rate of at least about 10 Gbit/sec.

In accordance with one embodiment of the present disclosure, a quantum key generation system including a low loss dispersion limiting fiber extending between and optically coupling a photonic quantum bit generator and a photon detector unit. The low loss dispersion limiting fiber has a core and a cladding surrounding the core and is structurally configured to limit dispersion of a photon comprising a wavelength of about 1550 nm at an absolute dispersion rate of about 10 ps/(nm)km or less and induce attenuation of the photon comprising the wavelength of about 1550 nm at an attenuation rate of about 0.175 dB/km or less such that quantum key bit information of a plurality of photons output by the photonic quantum bit generator is receivable at the photon detector unit at a bit rate of at least about 10 Gbit/sec.

According to some embodiments the low loss dispersion limiting fiber has a core and a cladding surrounding the core and is structurally configured to limit dispersion of a photon comprising a wavelength of about 1550 nm at an absolute dispersion rate of about 5 ps/(nm)km (i.e., 5 ps/nm·km) or less and induce attenuation of the photon comprising the wavelength of about 1550 nm at an attenuation rate of about 0.175 dB/km or less such that quantum key bit information of a plurality of photons output by the photonic quantum bit generator is receivable at the photon detector unit at a bit rate of at 10 Gbit/sec, for example of at least 25 Gbit/sec or 50 Gbit/sec. According to some embodiments the low loss dispersion limiting optical fiber is structurally configured to limit dispersion of a photon comprising a wavelength of about 1550 nm at an absolute dispersion rate of about 5 ps/(nm)km or less and induce attenuation of the photon comprising the wavelength of about 1550 nm at an attenuation rate between 0.12 dB/km and 0.175 dB/km.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
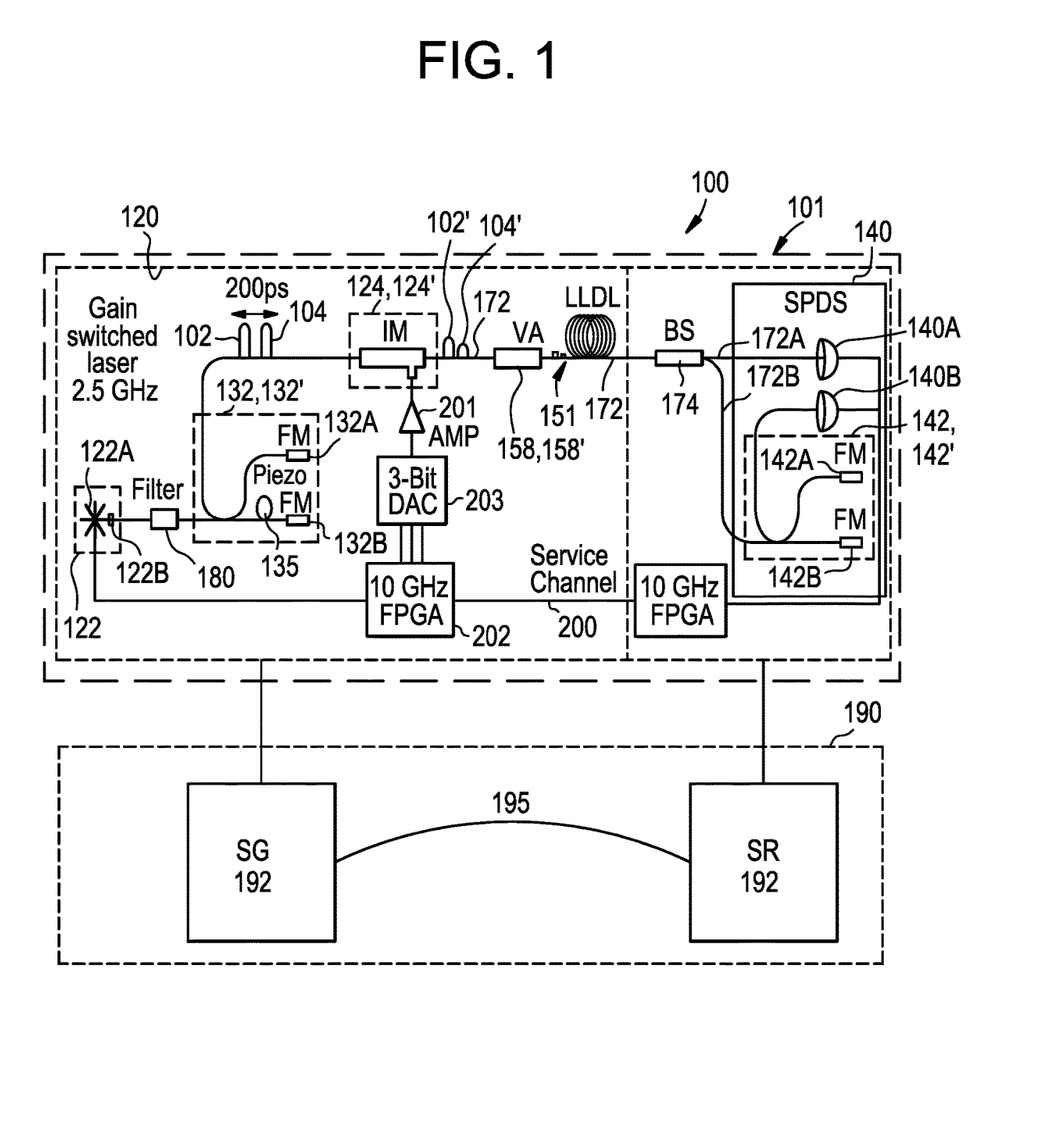
FIG. 1 schematically depicts a quantum communications system including a quantum key generation system and a communications network, according to one or more embodiments shown and described herein.

Referring now to FIG. 1, a quantum communications system 100 comprising a quantum key generation system 101 and a communications network 190 is schematically depicted. The quantum key generation system 101 includes a photonic quantum bit generator 120, a photon detector unit 140 and a dispersion limiting optical fiber 151 that extends between and optically couples the photonic quantum bit generator 120 and the photon detector unit 140. The photonic quantum bit generator 120 may be structurally configured to provide photons having any wavelength $\lambda$, for example, between about 800 and about 1800 nm, for example about 1550 nm. Similarly, the detector unit 140 may be structurally configured to detect photons provided by photonic quantum bit generator 120, for example photons having wavelength $\lambda$, about 800 and about 1800 nm, for example about 1550 nm.

The communications network 190 comprises a signal generator 192, a signal receiver 194, and a signal channel 195 that extends between and communicatively couples the signal generator 192 and the signal receiver 194. Further, the signal receiver 194 is communicatively coupled to the photon detector unit 140, communicatively coupling the quantum key generation system 101 to the communications network 190.

Referring still to FIG. 1, the photonic quantum bit generator 120 of the quantum key generation system 101 is structurally configured to output a plurality of photons each comprising a quantum key bit, and the photon detector unit 140 is structurally configured to determine quantum key bit information upon receipt of at least one of the plurality of photons provided by the photonic quantum bit generator 120. The quantum key bit information may comprise a cryptographic key which may be used to decode encrypted messages transferred using the communications network 190. Further, the signal generator 192 of the communications network 190 is structurally configured to output a signal comprising one or more signal bits, which may comprise portions of an encrypted message, and the signal receiver 194 is structurally configured to compare the one or more signal bits with the quantum key bit information upon receipt of the signal, for example, to decode the encrypted message using the cryptographic key comprising the quantum key bit information. The protocol utilized in the embodiment of FIG. 1 is based on time-bin encoding with the decoy state methods. Other protocols (e.g., twin-field QKD) may also be utilized. Exemplary Quantum key distribution (QKD) implementations may utilize 3 or more quantum states. For example, many quantum key distribution (QKD) implementations utilize 4 BB84 (quantum) states. Other implementations may also be utilized.

In operation, the plurality of photons comprising quantum key bits may traverse the low loss dispersion limiting optical fiber 151 situated between the photonic quantum bit generator 120 and the photon detector unit 140. The low loss dispersion limiting optical fiber 151 is structurally configured to control dispersion of a plurality of photons traversing the low loss dispersion limiting optical fiber 151 such that the temporal pulse width of each photon of the plurality of photons traversing the low loss dispersion limiting optical fiber 151 is less than the pulse spacing distance between adjacent photons. As used herein, the "temporal pulse width" is the full width half maximum (FWHM) of the peak intensity of each photon pulse. Further, as used herein "pulse spacing distance" is the distance between a pulse center of adjacent photon pulses, where the pulse center corresponds with the peak intensity of each photon pulse. For example, in some embodiments, the low loss dispersion limiting fiber 151 may be structurally configured to minimize broadening of the temporal pulse width of each photon pulse to prevent overlapping an adjacent photon pulse.

Figure 2:
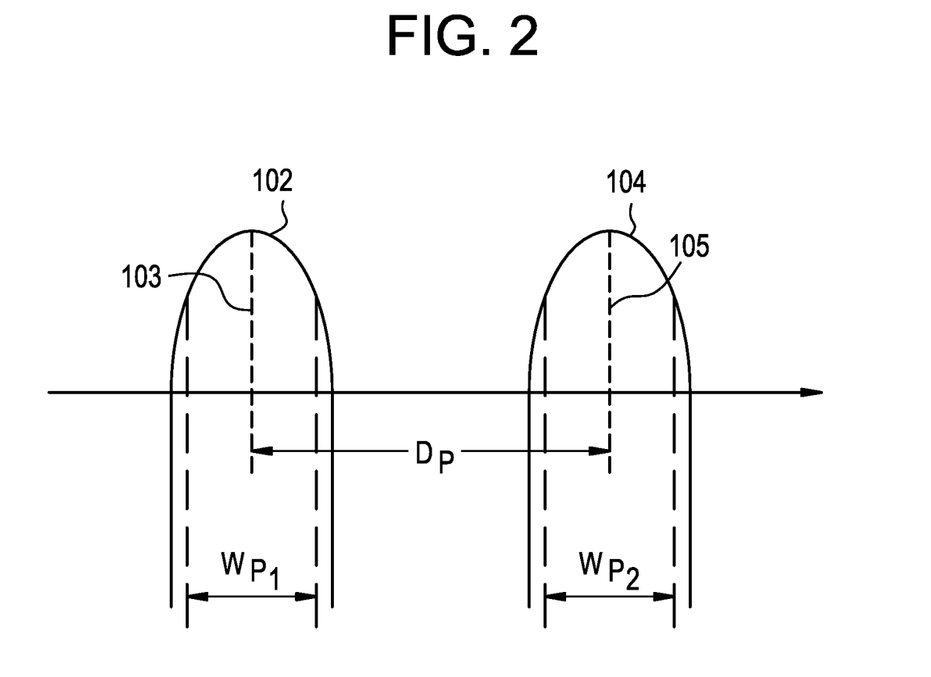
FIG. 2 schematically depicts a pair of photon pulses, according to one or more embodiments shown and described herein.

Referring now to FIG. 2, a temporal pulse width $W_{P1}$, of a first photon pulse 102 and a temporal pulse width $W_{P2}$ of a second photon pulse 104 are schematically depicted. The first photon pulse 102 and the second photon pulse 104 are example photons output by the photonic quantum bit generator 120 that are adjacently positioned and propagating along the low loss dispersion limiting fiber 151. The first photon pulse 102 comprises a pulse center 103 corresponding with the peak intensity of the first photon pulse 102 and the second photon pulse 104 comprises a pulse center 105 corresponding with the peak intensity of the second photon pulse 104. Further, the pulse center 103 of the first photon pulse 102 is spaced from the pulse center 105 of the second photon pulse 104 by a pulse spacing distance $D_P$. As shown in FIG. 2, the pulse spacing distance between the first photon pulse 102 and the second photon pulse 104 is larger than the sum of temporal pulse half widths of each photon pulse 102, 104 (i.e., $D_P > (W_{P1} + W_{P2})/2$) such that the first and second photon pulses 102, 104 do not overlap. For example, as shown in FIG. 2, the pulse spacing distance between the first photon pulse 102 and the second photon pulse 104 is larger than the temporal pulse width $W_{P1}$, $W_{P2}$ of each photon pulse 102, 104 such that the first and second photon pulses 102, 104 do not overlap. As a non-limiting example, the temporal pulse width may be from about 20 ps to about 200 ps, for example, about 30 ps, 40 ps, 50 ps, 60 ps, 70 ps, 80 ps, 90 ps, 100 ps, 110 ps, 120 ps, 125 ps, 130 ps, 140 ps, 150 ps, 160 ps, 170 ps, 180 ps, 190 ps, or the like.

Figure 3A:
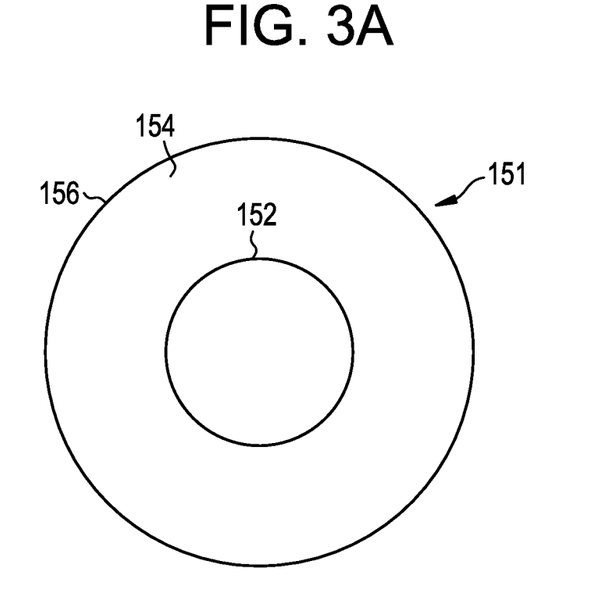
FIG. 3A schematically depicts a cross sectional view of an embodiment of the low loss dispersion limiting fiber of FIG. 1, according to one or more embodiments shown and described herein.

Referring now to FIGS. 3A-4B, the low loss dispersion limiting optical fiber 151 is depicted in more detail. FIGS. 3A and 4A each depict cross sections of embodiments of the low loss dispersion limiting fiber 151 of FIG. 1 along line A-A. In particular, FIG. 3A, depicts a low loss dispersion limiting optical fiber 151' comprising a core 152 and a cladding 154 surrounding the core 152. FIG. 4A depicts low loss dispersion limiting optical fiber 151" that also comprises the core 152 and the cladding 154 surrounding the core 152 and further comprises a cladding ring 155 disposed within the cladding 154, separating the cladding 154 into a first cladding portion 154a, positioned between the cladding ring 155 and the core 152 and a second cladding portion 154b. Further, FIGS. 3B and 4B each depict a graph of refractive index as a function of radius of the low loss dispersion limiting optical fiber 151', 151" of FIGS. 3A and 3B, respectively.

Referring again to FIGS. 3A and 4A, the fiber core 152 may comprise silica glass, polymer or the like and may be doped with K, Cl, F, or a combination thereof. While not intending to be limited by theory, doping the core 152 may reduce the viscosity and the fictive temperature of the core 152. The fiber cladding 154 includes an outer cladding surface 156 and may comprise pure silica, F-doped silica, F(fluorine)/B(boron) co-doped silica, low index polymer, or the like. Doping the cladding 154 with F may lower the refractive index of the cladding 154. Further, the cladding 154 comprises a lower refractive index than the core 152 to facilitate total internal reflection of a plurality of photons propagating through the low loss dispersion limiting fiber 151.

Figure 4A:
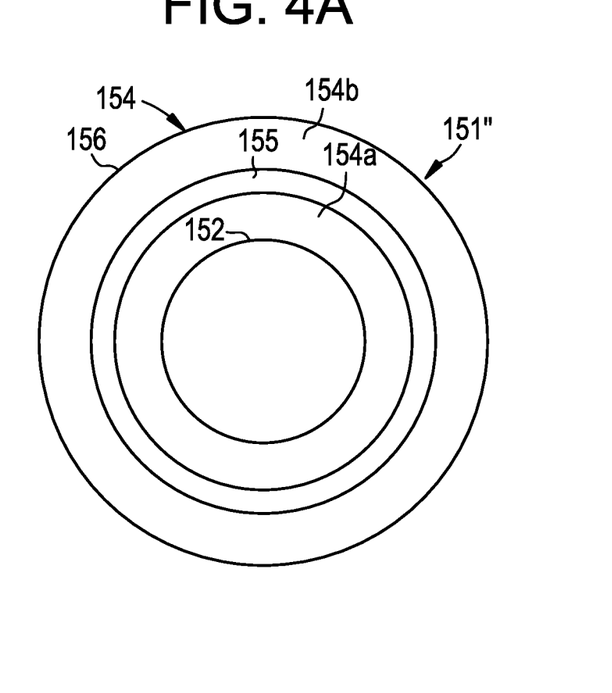
FIG. 4A schematically depicts a cross sectional view of another embodiment of the low loss dispersion limiting fiber of FIG. 1, according to one or more embodiments shown and described herein.

In the embodiments depicted in FIGS. 3A and 4A, the low loss dispersion limiting optical fiber 151', 151" comprise a single core 152, however, in other embodiments, the low loss dispersion limiting fibers 151', 151" may comprise multiple cores. In embodiments comprising multiple cores, the multiple cores may be spun and the low loss dispersion limiting optical fiber 151 may comprise any spin configuration, such as a unidirectional spin configuration, a bidirectional spin configuration, or the like. Further, in some embodiments, the low loss dispersion limiting optical fiber 151', 151" may comprise a step index profile, a parabolic index profile, a graded index profile, a triangular index profile, or the like.

Referring again to FIGS. 3A and 3B, the core 152 of the low loss dispersion limiting optical fiber 151' may comprise a radius $R_{CORE}$ of from about 1.5 μm to about 5 μm, for example, 2 μm to about 4 μm, 2.2 μm to about 3 μm, or the like. For example, 2.23 μm, 2.28 μm, 2.3 μm, 2.35 μm, 2.4 μm, 2.45 μm, 2.5 μm, 2.55 μm, 2.58 μm, 2.6 μm, 2.65 μm, 2.7 μm, 2.75 μm, 2.8 μm, 2.85 μm, 2.9 μm, 2.95 μm, or the like. The core 152 of low loss dispersion limiting optical fiber 151' comprises a refractive index $n_1$ and a relative refractive index $\Delta_1$ (which is relative to a refractive index $n_s$ of pure silica and denotes the refractive index change between pure silica and the core 152). The relative refractive index $\Delta_1$ comprises $(n_1-n_s)/n_s$. As stated above, the core 152 may be pure silica glass or glass doped with Cl, or K, or F for low loss. As non-limiting examples, the relative refractive index $\Delta_1$ may be from about −0.1 to about 0.2, or the like, for example, −0.1, −0.05, 0, 0.05, 0.1, 0.15, or the like. The cladding 154 comprises a refractive index $n_2$ and a relative refractive index $\Delta_2$ (which is relative to the refractive index $n_s$ of pure silica and denotes the refractive index change between pure silica and the core 152). The relative refractive index $\Delta_2$ comprises $(n_2-n_s)/n_s$. Further, $n_2<n_1$ and $\Delta_2<\Delta_1$. As non-limiting examples, the relative refractive index $\Delta_2$ may be from about −0.4 to about −0.7, or the like, for example, −0.45, −0.5, −0.55, −0.6–0.65, or the like.

Figure 3B:
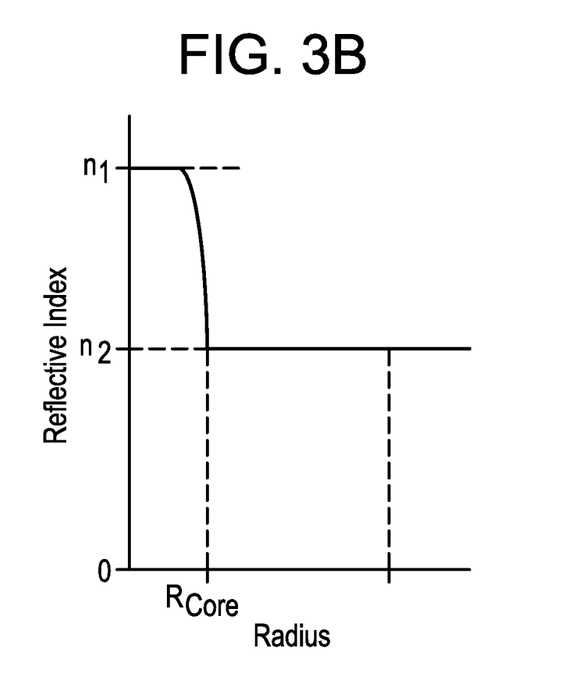
FIG. 3B graphically depicts refractive index of as a function of radius of the low loss dispersion limiting fiber of FIG. 3A, according to one or more embodiments shown and described herein.

Further, the low loss dispersion limiting optical fiber 151' comprises a relative refractive index change Δ between the core 152 and the cladding 154 of from about 0.3 to about 0.8, where $\Delta=\Delta_1-\Delta_2$. As non-limiting examples, the refractive index change Δ may be from about 0.4 to about 0.7, 0.5 to about 0.65, or the like, for example, 0.35, 0.4, 0.45, 0.5, 0.55, 0.6, 0.65, 0.7, 0.75, or the like. Further, including a dopant in the core 152, the cladding 154, or both, (e.g., an updopant or a downdopant) may alter the relative refractive index between the core 152 and the cladding 154, i.e. alter the refractive index change Δ. As used herein, an "updopant" is a dopant which has a propensity to raise the refractive index relative to pure undoped SiO2 and a "downdopant" is a dopant which has a propensity to lower the refractive index relative to pure undoped SiO2.

Referring still to FIGS. 3A and 3B, the low loss dispersion limiting optical fiber 151' may comprise a cutoff wavelength of about 1200 nm or less, for example, 1151 nm, 1100 nm, 1050 nm, 1031 nm, 1025 nm, 1000 nm, 975 nm, 973 nm, 950 nm, 929 nm, 925 nm, 915 nm, 911 nm, 909 nm, 905 nm, 900 nm, 875 nm, 850 nm, 825 nm, 800 nm, or the like. While not intending to be limited by theory, the cutoff wavelength is a wavelength above which guided higher order modes are no longer supported within the core 152 and the core 152 becomes a single mode core supporting only the fundamental mode. In operation, when one or more photons comprising a wavelength of about 1550 nm propagate along the low loss dispersion limiting optical fiber 151', the low loss dispersion limiting optical fiber 151' induces a mode field diameter MFD of from about 6.5 μm to about 10 μm, for example, about 7 μm to about 9.5 μm, 7.5 μm to about 9.0 μm, 7 μm to about 8.5 μm, or the like, such as 6 μm, 6.5 μm, 7 μm, 7.5 μm, 8 μm, 8.5 μm, 9 μm, 9.5 μm, 10 μm, or the like. While not intending to be limited by theory, the mode field diameter MFD is the transverse extent of the optical intensity distribution of the fundamental mode of the core 152 of the low loss dispersion limiting optical fiber 151'.

Further, when one or more photons comprising a wavelength of about 1550 nm propagate along the low loss dispersion limiting optical fiber 151', the dispersion limiting optical fiber 151' induces an effective area of from about 30 μm$^2$ to about 70 μm$^2$, for example, about 35 μm$^2$ to about 60 μm$^2$, about 40 μm$^2$ to about 55 μm$^2$, about 45 μm$^2$ to about 50 μm$^2$, or the like, such as 30 μm$^2$, 35 μm$^2$, 40 μm$^2$, 45 μm$^2$, 50 μm$^2$, 55 μm$^2$, 60 μm$^2$, 65 μm$^2$, 70 μm$^2$, 75 μm$^2$, 80 μm$^2$, or the like. While not intending to be limited by theory, the effective area is the cross sectional area over which the energy of the electric field of the fundamental mode of light propagating along the low loss dispersion limiting optical fiber 151' is distributed within the core 152. For example, the effective area of a single mode optical fiber is related to the maximum energy the core 152 can carry without inducing non-linear type signal penalties.

Referring still to FIGS. 3A and 3B, when one or more photons comprising a wavelength of about 1550 nm propagate along the low loss dispersion limiting optical fiber 151', the low loss dispersion limiting optical fiber 151' limits dispersion of the one or more photons of an absolute dispersion rate of not greater than 9 ps/(nm)km, for example about 8.6 ps/(nm)km or less, 8.5 ps/(nm)km or less, 8 ps/(nm)km or less, 7.5 ps/(nm)km or less, 7 ps/(nm)km or less, 6.5 ps/(nm)km or less, 6 ps/(nm)km or less, 5.7 ps/(nm)km or less, 5.5 ps/(nm)km or less, 5 ps/(nm)km or less, 4.5 ps/(nm)km or less, 4 ps/(nm)km or less, 3.6 ps/(nm)km or less, 3.5 ps/(nm)km or less, 3 ps/(nm)km or less, 2.5 ps/(nm)km or less, 2 ps/(nm)km or less, 1.5 ps/(nm)km or less, 1.1 ps/(nm)km, 1 ps/(nm)km or less, 0.5 ps/(nm)km or less, 0.1 ps/(nm)km or less, or the like. While not intending to be limited by theory, the absolute dispersion rate is the rate at which the photon pulse spreads outward from the pulse center 103 (FIG. 2), e.g., rate of increase of the temporal pulse width of the photon pulse.

Further, when one or more photons comprising a wavelength of about 1550 nm propagate along the low loss dispersion limiting optical fiber 151', the low loss dispersion limiting optical fiber 151' induces a dispersion slope of from about 0.05 ps/(nm$^2$)km (i.e., 0.05 ps/nm$^2$·km) to about 0.055 ps/(nm$^2$)km, for example, about 0.051 ps/(nm$^2$)km to about 0.054 ps/(nm$^2$)km, such as about 0.0515 ps/(nm$^2$)km, 0.0516 ps/(nm$^2$)km, 0.0518 ps/(nm$^2$)km, 0.052 ps/(nm$^2$)km, 0.0521 ps/(nm$^2$)km, 0.0525 ps/(nm$^2$)km, 0.053 ps/(nm$^2$)km, 0.0535 ps/(nm$^2$)km, 0.0538 ps/(nm$^2$)km or the like. While not intending to be limited by theory, the dispersion slope is the rate at which the absolute dispersion rate changes with wavelength. Smaller dispersion slope may be desired for flat dispersion over a wide wavelength window. Moreover, when one or more photons comprising a wavelength of about 1550 nm propagate along the low loss dispersion limiting optical fiber 151', low loss dispersion limiting optical fiber 151' induces an attenuation rate of about 0.175 dB/km or less, for example, about 0.17 dB/km or less about 0.165 dB/km or less, such as about 0.16 dB/km, 0.155 dB/km, 0.15 dB/km, 0.14 dB/km, 0.13 dB/km, 0.12 dB/km, or the like. While not intending to be limited by theory, the attenuation rate is rate of intensity loss (e.g., photon loss) of a plurality of photons propagating along the low loss dispersion limiting optical fiber 151'.

Tables 1 and 2, below, each list attributes of examples of the low loss dispersion limiting optical fiber 151' of FIGS. 3A and 3B.

TABLE 1

|  | First Example of low loss dispersion limiting optical fiber 151' | Second Example of low loss dispersion limiting optical fiber 151' | Third Example of low loss dispersion limiting optical fiber 151' |
|---|---|---|---|
| Core Material | Pure Silica | Pure Silica | Pure Silica |
| Relative Refractive Index $\Delta_1$ | 0 | 0 | 0 |
| Relative Refractive Index $\Delta_2$ | −0.5 | −0.55 | −0.6 |
| Index Profile | Step | Step | Step |
| Core Radius $R_{CORE}$ (μm) | 2.9 | 2.58 | 2.5 |
| Cutoff Wavelength (nm) | 1031 | 948 | 972 |
| Mode Field Diameter at 1550 nm (μm) | 8.5 | 8.3 | 7.8 |
| Effective Area at 1550 nm (μm$^2$) | 53.8 | 51.1 | 45.4 |
| Absolute Dispersion Rate at 1550 nm (ps/(nm)km) | 8.6 | 5.7 | 3.6 |
| Dispersion Slope at 1550 nm (ps/(nm$^2$)km) | 0.053 | 0.0518 | 0.0516 |
| Attenuation Rate at 1550 nm (dB/km) | 0.17 or less | 0.17 or less | 0.17 or less |

TABLE 2

|  | Fourth Example of low loss dispersion limiting optical fiber 151' | Fifth Example of low loss dispersion limiting optical fiber 151' | Sixth Example of low loss dispersion limiting optical fiber 151' |
|---|---|---|---|
| Core Material | Pure Silica | Chlorine Doped Silica | Chlorine Doped Silica |
| Relative Refractive Index $\Delta_1$ | 0 | 0.1 | 0.15 |
| Relative Refractive Index $\Delta_2$ | −0.65 | −0.5 | −0.5 |
| Index Profile | Step | Step | Step |
| Core Radius $R_{CORE}$ (μm) | 2.28 | 2.35 | 2.23 |
| Cutoff Wavelength (nm) | 929 | 911 | 909 |
| Mode Field Diameter at 1550 nm (μm) | 7.6 | 8.0 | 7.6 |
| Effective Area at 1550 nm (μm$^2$) | 42.8 | 47 | 43.4 |
| Absolute Dispersion Rate at 1550 nm (ps/(nm)km) | 0.1 | 1.1 | −0.8 |

TABLE 2-continued

|  | Fourth Example of low loss dispersion limiting optical fiber 151' | Fifth Example of low loss dispersion limiting optical fiber 151' | Sixth Example of low loss dispersion limiting optical fiber 151' |
| --- | --- | --- | --- |
| Dispersion Slope at 1550 nm (ps/(nm²)km) | 0.0521 | 0.0538 | 0.0530 |
| Attenuation Rate at 1550 nm (dB/km) | 0.17 or less | 0.17 or less | 0.17 or less |

Figure 4B:
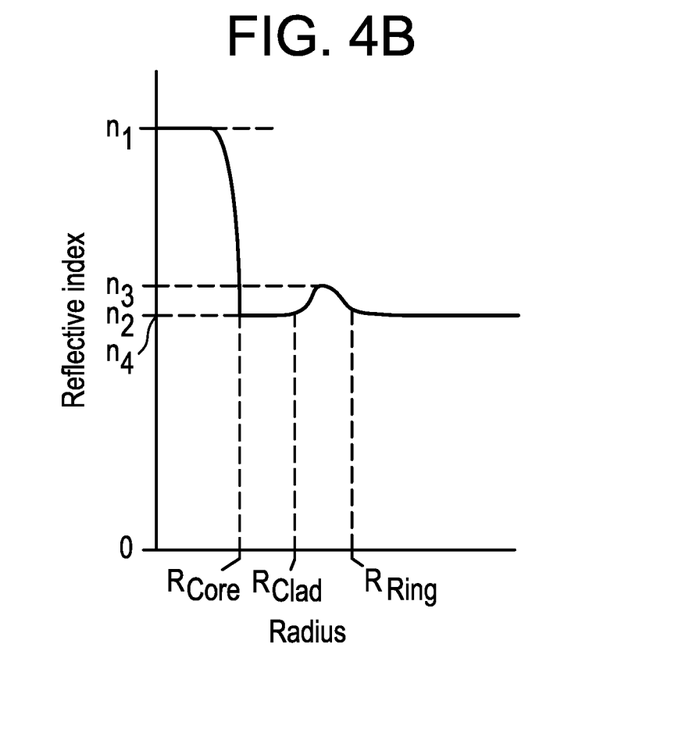
FIG. 4B graphically depicts refractive index of as a function of radius of the low loss dispersion limiting fiber of FIG. 4A, according to one or more embodiments shown and described herein.

Referring now to FIGS. 4A and 4B, the low loss dispersion limiting optical fiber 151" comprising the cladding ring 155 disposed within the cladding 154, between the first cladding portion 154a and the second cladding portion 154b, is schematically depicted (FIG. 4A) and graphically depicted (FIG. 4B). The core 152 of the low loss dispersion limiting optical fiber 151" may comprise a radius $R_{CORE}$ of from about 1.5 µm to about 5 µm, for example, 2 µm to about 4 µm, 2.2 µm to about 3 µm, 2.2 µm to about 2.8 µm, or the like, for example, 2.23 µm, 2.28 µm, 2.3 µm, 2.35 µm, 2.4 µm, 2.45 µm, 2.5 µm, 2.55 µm, 2.58 µm, 2.6 µm, 2.65 µm, 2.7 µm, 2.75 µm, 2.8 µm, 2.85 µm, 2.9 µm, 2.95 µm, or the like. The first cladding portion 154a of the low loss dispersion limiting optical fiber 151" comprises a radius $R_{CLAD}$ measured from an interface of the first cladding portion 154a and the cladding ring 155 of from about 3 µm to about 12 µm, for example about 4 µm to about 10 µm, 4.5 µm to 8.8 µm, or the like, such as 3 µm, 4 µm, 4.5 µm, 5 µm, 6 µm, 7 µm, 8 µm, 8.8 µm, 9 µm, 10 µm, 11 µm, 12 µm, or the like. Referring still to FIGS. 4A and 4B, the cladding ring 155 of the low loss dispersion limiting optical fiber 151" comprises a radius $R_{RING}$ measured from an interface of the cladding ring 155 and the second cladding portion 154b of from about 7 µm to about 13 µm, for example, 8 µm to about 12 µm, and about 9 µm to about 11.5 µm, or the like, such as, 7 µm, 7.5 µm. 8 µm, 8.5 µm, 9 µm, 9.5 µm, 10 µm, 10.5 µm, 11 µm, 11.4 µm, 11.5 µm, 12 µm, 12.5 µm, 13 µm, or the like.

Referring still to FIGS. 4A and 4B, the core 152 of the low loss dispersion limiting optical fiber 151" comprises a refractive index $n_1$ and a relative refractive index $\Delta_1$ (which is relative to the refractive index $n_s$ of pure silica and denotes the refractive index change between pure silica and the core 152). The relative refractive index $\Delta_1$ comprises $(n_1-n_s)/n_s$. The first cladding portion 154a comprises a refractive index $n_2$ and a relative refractive index $\Delta_2$ (which is relative to the refractive index $n_s$ of pure silica and denotes the refractive index change between pure silica and the first cladding portion 154a). The relative refractive index $\Delta_2$ comprises $(n_2-n_s)/n_s$. The cladding ring 155 comprises a refractive index $n_3$ and a relative refractive index $\Delta_3$ (which is relative to the refractive index $n_s$ of pure silica and denotes the refractive index change between pure silica and the cladding ring 155). The relative refractive index $\Delta_3$ comprises $(n_3-n_s)/n_s$. The second cladding portion 154b comprises a refractive index $n_4$ and a relative refractive index $\Delta_4$ (which is relative to the refractive index $n_s$ of pure silica and denotes the refractive index change between pure silica and the second cladding portion 154b). The relative refractive index $\Delta_4$ comprises $(n_4-n_s)/n_s$.

Further, $n_1>n_3>n_4>n_2$ and $\Delta_1>\Delta_3>\Delta_4>\Delta_2$. As stated above, the core 152 may be pure silica glass or glass doped with Cl, or K, or F for low loss. As non-limiting examples, the relative refractive index $\Delta_1$ may be from about −0.1 to about 0.2, for example, −0.1, −0.05, 0, 0.05, 0.1, 0.15, or the like.

The first cladding portion 154a, the cladding ring 155 and the second cladding portion 154b may each comprise glass (e.g., silica glass) doped with F for lowering their respective refractive indices. As non-limiting examples, the relative refractive index $\Delta_2$ may be from about −0.2 to about −0.7, or the like, for example, −0.25, 0.3, 0.35, −0.45, −0.5, −0.55, −0.6, −0.65, or the like. As non-limiting examples, the relative refractive index $\Delta_3$ may be from about −0.1 to about −0.5, or the like, for example, −0.15, −0.2, −0.25, −0.3, −0.35, −0.4, −0.45, or the like. As non-limiting examples, the relative refractive index $\Delta_4$ may be from about −0.2 to about −0.6, or the like, for example, −0.25, 0.3, 0.35, −0.45, −0.5, −0.55, −0.6, or the like.

The low loss dispersion limiting optical fiber 151" comprises a refractive index change $\Delta$ between the core 152 and the first cladding portion 154a of from about 0.2 to about 0.6, where $\Delta'=\Delta_1-\Delta_2$. In some embodiments, the refractive index change $\Delta'$ may be from about 0.4 to about 0.5, for example, 0.25, 0.3, 0.35, 0.4, 0.41, 0.43, 0.45, 0.47, 0.49, 5, 5.5, or the like. The low loss dispersion limiting optical fiber 151" also comprises a refractive index change $\Delta''$ between the first cladding portion 154a and the cladding ring 155 of from about 0 and about 0.2 (i.e. the refractive index of the cladding ring 155 may be higher than the refractive index of the first cladding portion 154a), where $\Delta''=\Delta_3-\Delta_2$. In some embodiments, the refractive index change $\Delta''$ may be about 0.02, 0.05, 0.1, 0.12, 0.15, 0.18, or the like. Moreover, the low loss dispersion limiting optical fiber 151" comprises a refractive index change $\Delta'''$ between the first cladding portion 154a and the second cladding portion 154b of from about 0 to about 0.1 (i.e. the refractive index of the second cladding portion 154b may be higher than the refractive index of the first cladding portion 154a), where $\Delta'''=\Delta_4-\Delta_2$. In some embodiments, the refractive index change $\Delta'''$ may be about −0.02, −0.04, −0.05, −0.1, or the like.

The low loss dispersion limiting optical fiber 151" may comprise a cutoff wavelength of about 1600 nm or less, 1500 nm or less, 1350 nm or less, or the like, for example, 1550 nm, 1516 nm, 1500 nm, 1464 nm, 1450 nm, 1403 nm, 1400 nm, 1384 nm, 1350 nm, 1300 nm, 1250 nm, 1200 nm, 11150 nm, 1100 nm, 1050 nm, 1000 nm, 950 nm, 900 nm, 850 nm, 800 nm, or the like. Further, when one or more photons comprising a wavelength of about 1550 nm propagate along the low loss dispersion limiting fiber 151", the low loss dispersion limiting optical fiber 151" induces a mode field diameter of a photon comprising a wavelength of about 1550 nm of from about 8 µm to about 12 µm, for example, about 9 µm to about 11 µm, 9.5 µm to about 10.5 µm, or the like, such as 8 µm, 8.5 µm, 9 µm, 9.5 µm, 9.9 µm, 10 µm, 10.1 µm, 10.2 µm, 10.5 µm, 11 µm, 11.5 µm, 12 µm, or the like.

Further, in some embodiments, the when one or more photons comprising a wavelength of about 1550 nm propagate along the low loss dispersion limiting optical fiber 151", the low loss dispersion limiting fiber 151" induces an effective area of from about 50 µm² to about 100 µm², 60 µm² to about 90 µm², 70 µm² to about 80 µm², or the like, such as 50 µm², 55 µm², 60 µm², 65 µm², 70 µm², 73.5 µm², 74.3 µm², 75 µm², 76.8 µm², 78.7 µm², 80 µm², 85 µm², 90 µm², 95 µm², 100 µm², or the like. Further, when one or more photons comprising a wavelength of about 1550 nm propagate along the low loss dispersion limiting optical fiber 151", the low loss dispersion limiting fiber 151" induces dispersion at an absolute dispersion rate of about 9 ps/(nm) km or less, for example about 8.6 ps/(nm)km or less, 8.5 ps/(nm)km or less, 8 ps/(nm)km or less, 7.5 ps/(nm)km or less, 7 ps/(nm)km or less, 6.5 ps/(nm)km or less, 6 ps/(nm) km or less, 5.7 ps/(nm)km or less, 5.5 ps/(nm)km or less, 5 ps/(nm)km or less, 4.5 ps/(nm)km or less, 4.5 ps/(nm)km or less, 4 ps/(nm)km or less, 3.8 ps/(nm)km 3.6 ps/(nm)km or less, 3.5 ps/(nm)km or less, 3 ps/(nm)km or less, 2.5 ps/(nm)km or less, 2 ps/(nm)km or less, 1.5 ps/(nm)km or less, 1.1 ps/(nm)km, 1 ps/(nm)km or less, 0.5 ps/(nm)km or less, 0.1 ps/(nm)km or less, or the like.

In some embodiments, when one or more photons comprising a wavelength of about 1550 nm propagate along the low loss dispersion limiting optical fiber 151", the low loss dispersion limiting optical fiber 151" induces dispersion at a dispersion slope of from about 0.05 ps/(nm$^2$)km to about 0.1 ps/(nm$^2$)km, 0.055 ps/(nm$^2$)km to about 0.085 ps/(nm$^2$)km, or the like, such as about 0.0525 ps/(nm$^2$)km, 0.055 ps/(nm$^2$)km, 0.0564 ps/(nm$^2$)km, 0.0575 ps/(nm$^2$)km, 0.06 ps/(nm$^2$)km, 0.0625 ps/(nm$^2$)km, 0.0645 ps/(nm$^2$)km, 0.065 ps/(nm$^2$)km, 0.0675 ps/(nm$^2$)km, 0.0676 ps/(nm$^2$)km, 0.07 ps/(nm$^2$)km, 0.0725 ps/(nm$^2$)km, 0.075 ps/(nm$^2$)km, 0.0775 ps/(nm$^2$)km, 0.08 ps/(nm$^2$)km, 0.0825 ps/(nm$^2$)km, 0.0834 ps/(nm$^2$)km, 0.085 ps/(nm$^2$)km, or the like.

Moreover, when one or more photons comprising a wavelength of about 1550 nm propagate along the low loss dispersion limiting optical fiber 151", the low loss dispersion limiting fiber 151" induces attenuation at an attenuation rate of about 0.175 dB/km or less, for example, 0.17 dB/km or less, about 0.165 dB/km or less, such as about 0.16 dB/km, 0.155 dB/km, 0.15 dB/km, 0.14 dB/km, 0.13 dB/Km, 0.12 dB/km, or the like.

Table 3, below, lists attributes of example low loss dispersion limiting optical fiber 151".

TABLE 3

| | First Example of low loss dispersion limiting optical fiber 151" | Second Example of low loss dispersion limiting optical fiber 151" | Third Example of low loss dispersion limiting optical fiber 151" | Fourth Example of low loss dispersion limiting optical fiber 151" |
|---|---|---|---|---|
| Core Material | Chlorine Doped Silica | Chlorine Doped Silica | Chlorine Doped Silica | Chlorine Doped Silica |
| Relative Refractive Index $\Delta_1$ | 0.15 | 0.15 | 0.15 | 0.15 |
| Relative Refractive Index $\Delta_2$ | −0.28 | −0.28 | −0.3 | −0.34 |
| Relative Refractive Index $\Delta_3$ | −0.15 | −0.16 | −0.15 | −0.34 |
| Relative Refractive Index $\Delta_4$ | −0.28 | −0.28 | −0.3 | −0.4 |
| Index Profile | Step | Step | Step | Step |
| Core Radius $R_{CORE}$ (μm) | 2.8 | 2.8 | 2.7 | 2.2 |
| First Cladding Portion Radius $R_{CLAD}$ (μm) | 8 | 8.8 | 4.5 | 8 |
| Cladding Ring Radius $R_{RING}$ (μm) | 11 | 11.4 | 11 | 9 |
| Cutoff Wavelength (nm) | 1516 | 1403 | 1464 | 1384 |
| Mode Field Diameter at 1550 nm (μm) | 10.2 | 9.9 | 10.1 | 9.9 |
| Effective Area at 1550 nm (μm$^2$) | 78.7 | 73.5 | 76.8 | 74.3 |
| Absolute Dispersion Rate at 1550 nm (ps/(nm)km) | 3.8 | 4.5 | 3.8 | 3.5 |
| Dispersion Slope at 1550 nm (ps/(nm$^2$)km) | 0.0645 | 0.0564 | 0.0676 | 0.0834 |
| Attenuation Rate at 1550 nm (dB/km) | 0.17 or less | 0.17 or less | 0.17 or less | 0.17 or less |

Referring to FIG. 1, the quantum key generation system 101 of the quantum communication system 100 is configured to propagate quantum key bit information without photon entanglement and comprises a photonic quantum bit generator 120 optically coupled to a photon detector unit 140 using one or more of low loss dispersion limiting optical fibers 151 described above. Incorporating the low loss dispersion limiting optical fiber 151 may increase the quantum key bit rate of the quantum key generation system 101 because the low loss dispersion limiting fibers 151 induce a low absolute dispersion rate and a low attenuation rate of photons propagating through the low loss dispersion limiting fibers 151.

The low loss dispersion limiting optical fiber(s) 151 does not require dispersion compensation. In accordance with one embodiment, there is no dispersion compensating fiber situated between the photonic quantum bit generator and the photon detector unit (e.g., there no dispersion compensating fiber coupled to the low loss dispersion limiting fiber). In accordance with one embodiment, there is no dispersion compensating fiber situated between the intensity modulator (IM) 124, 124' and the beam splitter beam 174.

Furthermore, as shown in FIG. 1, in this embodiment there is no single mode optical transmission fiber (such as, for example, SMF-28® fiber or SMF-28® Ultra Optical Fiber, available from Corning Incorporated, of Corning N.Y.) situated between the photonic quantum bit generator 120 and the photon detector unit 140. Accordingly, the low loss dispersion limiting optical fiber(s) 151 is not coupled to a typical single mode transmission fiber and thus does not pre-compensate for the chromatic dispersion introduced by such transmission fiber into the quantum channel. That is, the loss dispersion limiting optical fiber(s) 151, as shown in the embodiment shown in FIG. 1, does not need to be coupled to a single mode optical transmission fiber, and is not employed to provide dispersion compensation for such optical transmission fiber. The low loss dispersion limiting optical fiber(s) 151 in the embodiment of FIG. 1 is utilized in leu of a typical single mode transmission fiber such as SMF-28®, introduces very low dispersion levels into the quantum key generation system, and thus is not required to be coupled to a dispersion compensating fiber in order to compensate for the dispersion loss induced by the fiber(s) 151.

For example, as shown in FIG. 1, there is no optical transmission fiber (such as, for example, SMF-28® fiber or SMF-28® Ultra Optical Fiber) situated between the photonic quantum bit generator 120 and the photon detector unit 140. Also, for example, as shown in FIG. 1, there is no optical transmission fiber (such as, for example, SMF-28® fiber or SMF-28® Ultra Optical Fiber) situated between the intensity modulator (IM) 124, 124' and the beam splitter 174. In accordance with one embodiment, there is no optical transmission fiber situated between the photonic quantum bit generator 120 and the photon detector unit 140 that is coupled to the low loss optical low dispersion fiber. In accordance with one embodiment, the quantum communications system further comprises an intensity modulator and a beam splitter, such that there is no optical transmission fiber situated between the intensity modulator and the beam splitter.

A typical optical transmission single mode fiber has (or produces) dispersion of at least 18 ps/(nm)km around the 1550 nm wavelength. A typical low loss single mode transmission fiber has even a larger dispersion. In accordance with one embodiment, the low loss dispersion limiting fiber 151 is not coupled to:

(i) a single mode optical transmission fiber (through a VA 158) that has dispersion of at least 18 ps/(nm)km; and/or
(ii) a single mode optical transmission fiber that induces attenuation of 0.185 dB/km or greater at the wavelength of about 1550 nm.

The photonic quantum bit generator 120 of the quantum key generation system 101 may comprise a photon generator 122 that includes a laser 122A optically coupled to an intensity modulator (IM) 124. The laser 122A of the photonic quantum bit generator 120 may be configured to output a large number of photons at a high (raw data) bit rate. The photon generator 122 may comprise a laser 122A optically coupled to an optional non-linear crystal 122B. Further, photon generator 122 may be structurally configured to provide photons having any wavelength λ, for example, between about 800 and about 1800 nm, for example between about 1530 nm and about 1565 nm, about 1545 nm and about 1555 nm, or about 1550 nm. The photon detector unit 140 of the quantum key generation system 101 may comprise one or more single-photon detectors 140A, 140B, such as, for example, one or more single photon detector SPDD (e.g., superconducting nanowire single-photon detector(s)), carbon nanowire detectors, or the like. In operation, the quantum key generation system 101 may perform any known or yet to be developed non-entanglement based quantum communications protocols, such as the BB84 protocol, the E91 protocol, or the like.

Referring still to FIG. 1, the quantum key generation system 101 may further comprise an attenuator 158 optically coupled to the photonic bit generator 120, for example, positioned between and optically coupled to the photonic quantum key bit generator 120 and the photon detector unit 140. The attenuator 158 is structurally configured to attenuate a subset of the plurality of photons (i.e., photon pulses) output by the photonic quantum bit generator 120.

As shown in FIG. 1, the quantum key generation system 101 may further comprise an optional spectral filter 180 optically coupled to the laser 122A. The optional spectral filter 180 reduces the spectral width of the photon pulses generated by the laser 122A before they are coupled into the low loss dispersion limiting fiber 151, making the quantum communications system 100 less sensitive to dispersion (pulse broadening and/or overlap between pulses) as they propagate within low loss dispersion limiting optical fiber 151. The spectral filter 180 may be, for example, a band pass filter having a narrow bandpass (spectral) width of 0.2 nm to 0.5 nm. For example, the spectral filter 180 may be, a 0.2 nm, 0.25 nm, 0.275 nm, 0.3 nm, 0.4 nm, or a 0.5 nm bandpass filter. The photonic quantum key generator 120 may also comprise an interferometer, for example, a Michelsen interferometer 132. The Michelsen interferometer 132 comprises two Faraday mirrors (FM) 132A, 132B and splits each input photon pulse provided by the laser 122A into two adjacent photon pulses (with each adjacent photon pulse containing multiple photons). In some embodiments the Michelsen interferometer may split each photon pulse provided by the laser 122A into a pair of photon pulses separated by the temporal (time) difference of 25 ps to 1000 ps, for example by 50 ps to 500 ps, 30 ps to 100 ps, 50 ps to 500 ps, 100 ps to 500 ps, by 50 ps to 250 ps, by 50 ps to 150 ps (e.g., by 30 ps, 40 ps, 50 ps, 60 ps, 70 ps, 75 ps, 100 ps, or 150 ps, or 200 ps, 250 ps, or 300 ps, or 400 ps, or 500 ps, or therebetween). In some embodiments the pair of photon pulses provided by the Michelsen interferometer is separated by the temporal (time) difference of 50 ps to 100 ps.

In accordance with one embodiment, the low loss dispersion limiting fiber has a core and a cladding surrounding the core and is structurally configured to limit dispersion of a photon pulse having a wavelength of about 1550 nm at an absolute dispersion rate of about 5 ps/(nm)km (i.e., 5 ps/nm·km) or less, for example 1 ps/(nm)km-5 ps/(nm)km, and the quantum communications system 100 does not include the optional spectral filter 180. For example, in accordance with one embodiment, the low loss dispersion limiting fiber is structurally configured to limit dispersion of a photon pulse having a wavelength of about 1550 nm at an absolute dispersion rate of about 5 ps/(nm)km (also referred to as 5 ps/nm·km) or less, and the quantum communications system does not include a spectral filter optically coupled to a laser or to a photon generator. Also for example, according to some embodiments the quantum communications system does not include a spectral filter situated inside the photonic quantum bit generator.

In the embodiment of quantum communication system 100 shown in FIG. 1, in order to provide secure communication and to render potential coherent attacks ineffective, all photon pulses have random relative phase. This may be achieved, for example, by using a phase randomized laser. For example, in this embodiment the laser 122A is a phase randomized laser pulsed at 2.5 GHz. The phase randomness may be achieved, for example, by switching the laser current off between the pulses. However, the laser pulse rate may be, for example, between 1.5 GHz and 25 GHz (e.g., between 1.5 GHz and 10 GHz, or between 2 GHz and 10 GHz, or between 2 GHz and 5 GHz). Other techniques for randomizing relative pulse rate may also be employed. Other methods of providing pulse phase randomization may also be utilized.

One way of encoding multiple quantum states of photon pulses is by use of intensity modulator IM 124. In some embodiments the qubit state (i.e., quantum bit states or the quantum states of the photon pulses) and pulse amplitude are chosen at random by FPGA 202 (field programable gate array, or a similar device), for example by using a pseudo-random number generator. Alternatively, a ASIC, PSoC (Programmable System on Chip) or another similar device may be utilized instead of the FPGA 202. Thus, in such embodiments the IM 124 is controlled by either FPGA, ASIC, PSoc, or by another similar device. The FPGA or a similar device thus controls the amplitude variations produced by IM 124. The FPGA ASIC, PSoC or another similar device may be situated, for example, in the service channel 200.

For example, the FPGA 202 provides very high speed (very fast rate) outputs to a digital-to-analog converter DAC 203. The multiple outputs (e.g., three or four)) from the FPGA 202 are linked to the DAC 203 that generates pulses (e.g., radio-frequency) that drive the intensity modulator IM 124. An optional amplifier 201 (e.g., RF signal amplifier) is situated between the intensity modulator 124 and DAC 203 and amplifies the pulses provided by the DAC to IM 124. For example, three states may be encoded with the intensity modulator (s) IM 124 shown in FIG. 1. Other implementations of phase encoding, for example with decoy state(s) may require a phase modulator (not shown) in addition to intensity modulator. Intensity modulator IM 124, for example a lithium niobate (LiNbO3) intensity modulator, modulates the intensity of the pulses exiting the interferometer and then provides the modulated pulses to an optical attenuator 158 (e.g., a variable attenuator VA).

The intensity modulator IM 124 receives the separated photon pulses 102, 104 provided by the Michelsen interferometer, attenuates their intensity according to the signals received from the DAC 203, and then couples the attenuated separated photon pulses 102', 104' to the low loss dispersion limiting optical fiber 151 via the optical attenuator 158. While the intensity modulator 124 controls the intensity of the pulses so as to provide the requited pulse amplitude to the variable attenuator 158, each pulse power exiting the IM 124 corresponds to that provided by a plurality of photons (i.e., hundreds or even thousands of photons). The optical attenuator 158 then limits the power of the photon pulses to the desired mean photon number (e.g., to a single photon level).

More specifically, the photon pulses provided the laser 122a pass through the optional spectral filter and then through the Michelsen interferometer 132. The Michelsen interferometer 132 may be an unbalanced fiber optic Michelsen interferometer (e.g., an interferometer with two arms A, B having an unequal path length) that splits each photon pulse into two adjacent photon pulses P1, P2, that are coherent with each other and introduces a delay (time interval) between the two adjacent photon pulses. (The Michelsen interferometer creates a pair of pulses 102, 104, temporally separated by the optical path difference between the two arms divided by the speed of light, from a single input pulse). The time interval between pulses 102, 104, depends on the difference in length of between the two arms A, B of the interferometer 132. In the embodiment shown in FIG. 1, one of the interferometer arms is equipped with a piezoelectric fiber stretcher 135 structured to adjust the interferometer phase. This adjustment helps improves the stability of the quantum key distribution system by compensating for the environmental fluctuations, such as temperature changes, etc. For example, piezoelectric fiber stretcher may be 135 coupled to a controller (not shown) that senses temperature fluctuations, etc. within the quantum key generation system 101) and sends a signal to the piezoelectric fiber stretcher to adjust the length of the fiber of the arm B of the fiber optic Michelsen interferometer 132.

The attenuator 158 (e.g., variable attenuator VA 158') coupled to the intensity modulator 124 attenuates the signal (i.e., photon pulses 102, 104) in order to set the desired mean photon number of the outgoing signals (photon pulses 102', 104'). The attenuator 158 is positioned between and optically coupled to the photonic quantum key bit generator 120 and the photon detector unit 140. The attenuator 158 is structurally configured to attenuate a subset of the plurality of photons output by the photonic quantum bit generator 120. The quantum key generation system 101 may also include other components each positioned between and optically coupled to the attenuator 158 and the photon detector unit 140. Each of these components may be optically coupled to adjacently positioned optical components and thereby optically coupled to the photonic key bit generator 120 and the photon detector unit 140 using the low loss dispersion limiting fibers 151 described above.

As stated above with respect to FIG. 2, the low loss dispersion limiting optical fiber 151 may be configured to optimize the temporal pulse width of photon pulses propagating along the low loss dispersion limiting optical fiber 151. Referring again to FIG. 1, the temporal pulse width of photons propagating along the low loss dispersion limiting optical fiber 151 is such that two photons received by a photon detector unit 140 comprise the same or similar temporal pulse widths. In some embodiments, the low loss dispersion limiting optical fiber 151 has a core length, L where L<2000 km. In some embodiments, the low loss dispersion limiting optical fiber 151 has a core length, L where L>100 km, or L>150 km, or L>200 km (e.g., 100 km to 1000 km, or 200 km to 1000 km, or 300 km to 1000 km, or 300 km to 600 km, or 400 km to 700 km). In particular, the loss dispersion limiting optical fiber 151 (e.g., the loss dispersion limiting optical fiber 151' of FIGS. 3A and 3B and the loss dispersion limiting optical fiber 151" of FIGS. 4A and 4B) are configured such that the quantum key bit information of the plurality of photons output by the one or more photonic quantum bit generators 120 is receivable at one or more photon detector units 140 at a bit rate (i.e., raw data bit rate) of at least 10 Gbit/sec, for example, 20 Gbit/sec, 30 Gbit/sec, 40 Gbit/sec, 50 Gbit/sec, 75 Gbit/sec, 100 Gbit/sec, 150 Gbit/sec, 200 Gbit/sec, 250 Gbit/sec, or 500 Gbit/sec. This raw data bit rate corresponds to quantum key generation system's key rate of at least 10 Kbit/sec.

Referring still to FIG. 1, the quantum key generation system 101 further comprises a beam splitter (BS) 174 optically coupled to the photodetector unit 140 and the low loss dispersion limiting optical fiber 151, such that the low loss dispersion limiting optical fiber 151 is situated between the photonic quantum bit generator 120 and the photon detector unit 140 along the optical path 172. In operation, the plurality of photon pulses comprising quantum key bits traverse the low loss dispersion limiting optical fiber 151 such that the photon pulses are incident on the beam splitter 174 before they are routed to the photon detector unit 140. That is, the photons propagating through the low loss dispersion limiting optical fiber 151 traverse the beam splitter 174 before they are detected by the photon detector 140. In the embodiment shown in FIG. 1, photodetector unit 140 comprises a pair of photon detectors, i.e., a first photon detector 140A, and a second photon detector 140B optically coupled to an interferometer 142 (e.g., unbalanced Michelsen interferometer 142') with the same delay as the interferometer 132). An automatic feedback loop stabilizes the relative phase between two interferometers 132, 142.

The beam splitter 174 splits the optical path 172 into plurality of optical paths, for example optical paths 172A and 172B. In the embodiment shown in FIG. 1, an SPD (single photon detector) 140A detects the photons propagating along the optical paths 272A, while the photons propagating through another optical path 172B are provided to an interferometer 142. Referring still to FIG. 1, the first and the second photon detectors 140A, 140B are structurally configured to receive the measurable particles (i.e., photon pulses) generated by the photonic quantum bit generator 120. More specifically, each photon detector unit 140A, 140B measures a particle property (phase of the photon pulses or time interval between the pulses) of the measurable particles.

In this embodiment, the unbalanced Michelsen interferometer 142' splits each photon pulse into two pulses, with each pulse provided to an individual Faraday mirror (FM) 142A, 142B. The reflected pulses are then combined by the interferometer 142 and provided to the single photon detector 140B for detection. The photon detectors 140A, 140B may comprise one or more low noise photodiodes and/or one or more single-photon detectors, such as, for example, one or more superconducting nanowire single-photon detectors. However, any combination of detectors disposed in the quantum key generation system 101 is contemplated.

In this embodiment, the particle property is phase. However, in other embodiments, the particle property may comprise any quantum information. For example, in other embodiments the particle property may comprise any measurable quantum property particle, a linear polarization, a circular polarization, spin, translational momentum, orbital angular momentum, or the like. The particle property measured by each photon detector 140A, 140B may be converted into a quantum key bit. Each quantum key bit may comprise a binary bit, e.g., a "1" bit or a "0" bit. In some embodiments, the particle property measured by each photon detector 140A, 140B may comprise a particle property such that each quantum key bit produced at each photon detector comprises a matching binary bit. For example, when the photon detector 140A measures a property that comprises a "0" bit, the photon detector 140B may also measures a property that comprises a "0" bit. In other embodiments, the particle property measured by each photon detector unit 140A, 140B comprises an orthogonal particle property such that each quantum key bit produced at each photon detector comprises an opposite binary bit. For example, when the photon detector 140A measures an orthogonal property that comprises a "0" bit, the photon detector 140B also measures an orthogonal e property that comprises a "1" bit.

Further, in operation, a plurality of iteratively converted quantum key bits may form a quantum key at each photon detector 140A, 140B. For example, each photon detector 140A, 140B may convert iteratively received quantum key bits into a set of binary bits, such that each photon detector 140A and 140B may receive a quantum key correlated with the quantum key received by the other photon detector 140A, 140B. This allows the quantum key to be used as a cryptography key such that communication between the sender and the receiver over classical communication channels (e.g., the signal channels 195 of the communications network 190 of FIG. 1) may be encrypted with the quantum key. Additionally, some embodiments may comprise electronic storage devices communicatively coupled to the photon detector units 140A, 140B and structurally configured to electronically store the quantum key bits. In other embodiments, the photon detector unitOs 140 may be structurally configured to electronically store the quantum key.

A primary application for technology disclosed herein is communication of quantum key bit information due at least in part to the nature and mechanics of quantum communication. However, as may well be understood from the above disclosure, other and/or additional information may well be communicated via technology disclosed herein, and claims and disclosure herein with respect to communication of quantum key bit information may be generalized to communication of information and quantum information.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum communications system comprising:
    a quantum key generation system comprising a photonic quantum bit generator, a low loss dispersion limiting fiber, and a photon detector unit; and
    a communications network comprising a signal generator, a signal channel, and a signal receiver; wherein:
        the low loss dispersion limiting fiber extends between and optically couples the photonic quantum bit generator and the photon detector unit having a length L;
        the photonic quantum bit generator is structurally configured to output a plurality of photons each comprising quantum key bit information;
        the photon detector unit is structurally configured to receive the quantum key bit information of the plurality of photons;
        the signal channel extends between and communicatively couples the signal generator and the signal receiver;
        the signal generator is structurally configured to output a signal comprising one or more signal bits;
        the signal receiver is communicatively coupled to the photon detector unit and is structurally configured to compare the one or more signal bits with the quantum key bit information upon receipt of the signal; and
        the low loss dispersion limiting fiber, the fiber comprises a core and a cladding surrounding the core and is structurally configured to limit dispersion of a photon pulse having a wavelength of about 1550 nm at an absolute dispersion rate of about 9 ps/(nm)km or less and induce attenuation of the photon comprising the wavelength of about 1550 nm at an attenuation rate of about 0.175 dB/km or less such that the quantum key bit information of the plurality of photons output by the photonic quantum bit generator is receivable at the photon detector unit at a bit rate of at least 10 Gbit/sec.

2. The quantum communications system of claim 1, wherein the core comprises silica based glass, and L is between 200 km and 1000 km.

3. The quantum communications system of claim 2, wherein the silica glass of the core is doped with K, Cl, F, or a combination thereof.

4. The quantum communications system of claim 1, wherein the low loss dispersion limiting fiber comprises a step index profile, or a parabolic index profile.

5. The quantum communications system according to claim 1, wherein the core comprises a radius of from about 2.2 μm to about 3 μm.

6. The quantum communications system according to claim 1, wherein the core of the low loss dispersion limiting fiber comprises a relative refractive index $\Delta_1$ of from about −0.1 to about 0.2, where:
    $\Delta_1$ comprises $(n_1-n_s)/n_s$;
    $n_1$ comprises a refractive index of the core; and
    $n_s$ comprises a refractive index of pure silica.

7. The quantum communications system according to claim 1, wherein the cladding of the low loss dispersion limiting fiber comprises a relative refractive index $\Delta_2$ of from about −0.4 to about −0.7, where:
    $\Delta_2$ comprises $(n_2-n_s)/n_s$;
    $n_2$ comprises a refractive index of the cladding; and
    $n_s$ comprises a refractive index of pure silica.

8. The quantum communications system according to claim 1, wherein: (i) the low loss dispersion limiting fiber comprises a cutoff wavelength of about 1200 nm or less; or (ii) the low loss dispersion limiting fiber comprises a mode field diameter of from about 7.5 μm to about 9.0 μm; or (iii) the low loss dispersion limiting fiber comprises an effective area of from about 40 μm² to about 55 μm².

9. The quantum communications system according to claim 1, wherein the low loss dispersion limiting fiber comprises a dispersion slope of from about 0.051 ps/(nm²)km to about 0.054 ps/(nm²)km.

10. The quantum communications system according to claim 1, wherein the cladding comprises a first cladding portion, a second cladding portion, and a cladding ring disposed between the first cladding portion and the second cladding portion.

11. The quantum communications system of claim 10, wherein the core comprises a radius of from about 2.2 μm to about 2.8 μm.

12. The quantum communications system of claim 10, wherein the core of the low loss dispersion limiting fiber comprises a relative refractive index $\Delta_1$ of from about −0.1 to about 0.2, where:
    $\Delta_1$ comprises $(n_1-n_s)/n_s$;
    $n_1$ comprises a refractive index of the core; and
    $n_s$ comprises a refractive index of pure silica.

13. The quantum communications system of claim 10, wherein the first cladding portion of the low loss dispersion limiting fiber comprises a relative refractive index $\Delta_2$ of from about −0.2 to about −0.7, where:
    $\Delta_2$ comprises $(n_2-n_s)/n_s$;
    $n_2$ comprises a refractive index of the first cladding portion; and
    $n_s$ comprises a refractive index of pure silica.

14. The quantum communications system of claim 10, wherein the cladding ring of the low loss dispersion limiting fiber comprises a relative refractive index $\Delta_3$ of from about −0.1 to about −0.5, where:
  $\Delta_3$ comprises $(n_3-n_s)/n_s$;
  $n_2$ comprises a refractive index of the cladding ring; and
  $n_s$ comprises a refractive index of pure silica.

15. The quantum communications system of claim 10, wherein the second cladding portion of the low loss dispersion limiting fiber comprises a relative refractive index $\Delta_4$ of from about −0.2 to about −0.6, where:
  $\Delta_4$ comprises $(n_4-n_s)/n_s$;
  $n_4$ comprises a refractive index of the second cladding portion; and
  $n_s$ comprises a refractive index of pure silica.

16. The quantum communications system of claim 10, wherein: (i) the low loss dispersion limiting fiber comprises a cutoff wavelength of about 1500 nm or less; or (ii) the low loss dispersion limiting fiber comprises a mode field diameter of from about 9.5 µm to about 10.5 µm; or (iii) or low loss dispersion limiting fiber comprises an effective area of from about 70 µm² to about 80 µm²; or (iv) the low loss dispersion limiting fiber comprises a dispersion slope of from about 0.055 ps/(nm²)km to about 0.085 ps/(nm²)km.

17. The quantum communications system of claim 1, wherein the quantum key generation system further comprises an attenuator optically coupled to the photonic quantum bit generator and structurally configured to attenuate a subset of the plurality of photons output by the photonic quantum bit generator.

18. The quantum communications system according to claim 1, wherein the photon detector unit comprises a single-photon detector.

19. The quantum communications system according to claim 1, wherein: (i) the low loss dispersion limiting fiber is structurally configured such that the quantum key bit information of the plurality of photons output by the photonic quantum bit generator is receivable at the photon detector unit at a bit rate of at least 50 Gbit/sec; or (ii) the low loss optical low dispersion fiber comprises a core and a cladding surrounding the core and is structurally configured to limit dispersion of a photon pulse having a wavelength of about 1550 nm at an absolute dispersion rate of about 5 ps/(nm)km or less.

20. The quantum communications system of claim 1, further comprising intensity modulator and the beam splitter, such that there is no optical transmission fiber situated between the intensity modulator and the beam splitter.

21. The quantum communications system of claim 1, wherein there is no optical transmission fiber situated between the photonic quantum bit generator and the photon detector unit that is coupled to the low loss dispersion limiting fiber.

22. The quantum communications system of claim 1, wherein there is no dispersion compensating fiber situated between the photonic quantum bit generator and the photon detector unit that is coupled to the low loss dispersion limiting fiber.

23. The quantum communications system according to claim 1, further comprising a laser and a spectral filter optically coupled to the laser, the spectral filter is a bandpass filter with the bandpass width of 0.2 nm to 0.5 nm.

24. A quantum key generation system comprising:
  a low loss dispersion limiting fiber extending between and optically coupling a photonic quantum bit generator and a photon detector unit, wherein:
    the low loss dispersion limiting fiber comprises a core and a cladding surrounding the core, has a length of at least 200 km, and is structurally configured to limit dispersion of a photon comprising a wavelength of about 1550 nm at an absolute dispersion rate of about 9 ps/(nm)km or less and induce attenuation of the photon pulse having the wavelength of about 1550 nm at an attenuation rate of about 0.175 dB/Km or less such that quantum key bit information of a plurality of photons output by the photonic quantum bit generator is receivable at the photon detector unit at a bit rate of at least about 10 Gbit/sec.

25. A quantum communications system comprising:
  a quantum key generation system comprising a photonic quantum bit generator, a low loss dispersion limiting fiber, and a photon detector unit; and
  a communications network comprising a signal generator, a signal channel, and a signal receiver; wherein:
    the low loss dispersion limiting fiber extends between and optically couples the photonic quantum bit generator and the photon detector unit having a length L between 200 km and 1000 km;
    the photonic quantum bit generator is structurally configured to output a plurality of photons each comprising quantum key bit information;
    the photon detector unit is structurally configured to receive the quantum key bit information of the plurality of photons;
    the signal channel extends between and communicatively couples the signal generator and the signal receiver;
    the signal generator is structurally configured to output a signal comprising one or more signal bits;
    the signal receiver is communicatively coupled to the photon detector unit and is structurally configured to compare the one or more signal bits with the quantum key bit information upon receipt of the signal; and
    the low loss dispersion limiting fiber comprises a core and a cladding surrounding the core and is structurally configured to limit dispersion of a photon pulse having a wavelength of about 1550 nm at an absolute dispersion rate of about 9 ps/(nm)km or less and induce attenuation of the photon comprising the wavelength of about 1550 nm at an attenuation rate of about 0.175 dB/km or less such that the quantum key bit information of the plurality of photons output by the photonic quantum bit generator is receivable at the photon detector unit at a bit rate of at least 10 Gbit/sec.

26. A quantum system comprising:
  a quantum key system comprising a photonic quantum bit generator, a low loss dispersion limiting fiber, and a photon detector unit; and
  a signal receiver; wherein:
    the low loss dispersion limiting fiber extends between and optically couples the photonic quantum bit generator and the photon detector unit having a length L between 100 km and 1000 km;
    the photonic quantum bit generator is structurally configured to output a plurality of photons each comprising quantum key bit information;
    the photon detector unit is structurally configured to receive the quantum key bit information of the plurality of photons;
    the signal receiver is communicatively coupled to the photon detector unit and is structurally configured to compare the one or more signal bits with the quantum key bit information upon receipt of the signal; and the low loss dispersion limiting fiber comprises a core and a cladding surrounding the core and is structurally configured to limit dispersion of a photon pulse having a wavelength of about 1550 nm at an absolute dispersion rate of about 9 ps/(nm)km or less and induce attenuation of the photon comprising the wavelength of about 1550 nm at an attenuation rate of about 0.175 dB/km or less such that the quantum key bit information of the plurality of photons output by the photonic quantum bit generator is receivable at the photon detector unit at a bit rate of at least 10 Gbit/sec.

27. The quantum system of claim 26, wherein length L is between 100 km and 2000 km.

* * * * *

UNITED STATES PATENT AND TRADEMARK OFFICE
CERTIFICATE OF CORRECTION

PATENT NO. : 11,431,419 B2
APPLICATION NO. : 17/297029
DATED : August 30, 2022
INVENTOR(S) : Ming-Jun Li et al.

It is certified that error appears in the above-identified patent and that said Letters Patent is hereby corrected as shown below:

On the Title Page

On the page 2, in Column 2, under Item (56) "Other Publications", Line 27, delete "dirstibution" and insert -- distribution --.

In the Claims

In Column 21, Line 6, in Claim 14, delete "$n_2$" and insert -- $n_3$ --.

Signed and Sealed this
First Day of August, 2023

*Katherine Kelly Vidal*
*Director of the United States Patent and Trademark Office*